US010111556B2

(12) United States Patent
Yan

(10) Patent No.: US 10,111,556 B2
(45) Date of Patent: Oct. 30, 2018

(54) STEPLESS HEIGHT-ADJUSTABLE GRILL

(71) Applicant: NINGBO KAIBO GROUP CO., LTD., Ningbo, Zhejiang (CN)

(72) Inventor: Jiebo Yan, Zhejiang (CN)

(73) Assignee: NINGBO KAIBO GROUP CO., LTD., Ningbo, Zhejiang (CN)

( * ) Notice: Subject to any disclaimer, the term of this patent is extended or adjusted under 35 U.S.C. 154(b) by 18 days.

(21) Appl. No.: 15/269,992

(22) Filed: Sep. 20, 2016

(65) Prior Publication Data

US 2017/0367531 A1    Dec. 28, 2017

(30) Foreign Application Priority Data

Jun. 23, 2016 (CN) .......................... 2016 1 0481314
Jun. 23, 2016 (CN) ...................... 2016 2 0647071 U

(51) Int. Cl.
*A47J 37/06* (2006.01)

(52) U.S. Cl.
CPC .... *A47J 37/0611* (2013.01); *A47J 2037/0617* (2013.01)

(58) Field of Classification Search
CPC ............ A47J 37/0611; A47J 2037/0617; A47J 27/62; A47J 36/38; A47J 36/36; A47J 37/0704; A47J 43/18; A47J 27/004; A47J 27/0813; A47J 27/092; A47J 36/34; A47J 37/041; A47J 37/0664; A47J 37/0676; A47J 37/0786; A47J 37/0629
USPC ........... 99/372, 331, 337, 349, 329 P, 329 R, 99/329 RT, 333, 342, 351, 353, 385, 389, 99/390, 391, 392, 399, 400, 403, 449, 99/450, 645, 374–379, 380, 422–424, 99/426, 427
See application file for complete search history.

(56) References Cited

U.S. PATENT DOCUMENTS

| 5,247,877 | A | * | 9/1993 | Beard | ................. A47J 37/0704 126/41 D |
| 6,439,108 | B1 | * | 8/2002 | Wu | ....................... A47J 37/0611 99/349 |
| 2005/0139086 | A1 | * | 6/2005 | McHutchison | ...... A47J 37/0611 99/389 |

(Continued)

FOREIGN PATENT DOCUMENTS

GB    2355390 A  *  4/2001  .......... A47J 37/0611

*Primary Examiner* — Ibrahime A Abraham
*Assistant Examiner* — Chris Liu
(74) *Attorney, Agent, or Firm* — Global IP Services; Tianhua Gu

(57) ABSTRACT

A stepless height-adjustable grill, an inclined rail is disposed on one side of a base body, and a corresponding connecting rod is provided with a slidable height fixing slider which is positioned on the inclined rail. The inclined rail is provided with a lock-up edge, while the height fixing slider is provided with a lock; when the height fixing slider is positioned on the inclined rail, the lock is interlocked with the lock-up edge by means of the spring force of a spring to position the height fixing slider on the inclined rail. The lock is provided with a release portion which overcomes the spring force of the spring to release the interlocking between the lock and the lock-up edge. The interlocking between the lock and the lock-up edge can be released by operating the release portion, and the upper cover component can be freely lifted by a handle.

8 Claims, 5 Drawing Sheets

(56) References Cited

U.S. PATENT DOCUMENTS

| | | | |
|---|---|---|---|
| 2009/0308260 A1* | 12/2009 | Trost | A47J 37/0611 99/349 |
| 2012/0152126 A1* | 6/2012 | Robinson | A47J 37/0611 99/331 |
| 2015/0033528 A1* | 2/2015 | Fung | A47J 37/0611 29/401.1 |
| 2015/0033956 A1* | 2/2015 | Fung | A47J 36/36 99/390 |
| 2015/0037482 A1* | 2/2015 | Fung | A47J 27/62 426/523 |

* cited by examiner

STEPLESS HEIGHT-ADJUSTABLE GRILL

BACKGROUND OF THE INVENTION

Technical Field

The present invention relates to food cookers, specifically to a stepless height-adjustable grill.

Description of Related Art

At present, the majority of common grills commercially available on the market usually use sliding push buttons 101 and 102 together with height fixing steps 201 and 202 to adjust the height of an upper cover component to be adapted to the thickness of grilled foods. However, as shown in FIGS. 1 and 2, only a few height fixing steps are provided (5 steps as shown in FIG. 1 and 3 steps as shown in FIG. 2), so the height of the upper cover component can be adjusted among a few positions only, which fails to meet the demands of grilling various foods of different thicknesses in actual use. Moreover, the sliding push buttons are usually not positioned, and easily slip and fall down from the height fixing steps. Besides, during food cooking, it is difficult to adjust the degree of compaction applied by an upper grilling disc onto foods according to demands. For example, to adjust the positions of the sliding push buttons on two adjacent steps, foods may be compacted too much or food compacting may fail.

BRIEF SUMMARY OF THE INVENTION

The technical problem to be solved by and the technical task put forward by the present invention are to provide a stepless height-adjustable grill to overcome a defect, failing to meet the demands of grilling various foods of different thicknesses, of the existing grills.

To fulfill the above objective, the stepless height-adjustable grill of the present invention includes a base, a lower grilling disc, an upper grilling disc, an upper cover and a handle; wherein the lower grilling disc and the base form a base body; the upper grilling disc and the upper cover form an upper cover component; the handle includes a grip, a left connecting rod and a right connecting rod; the left connecting rod and the right connecting rod extend toward the same direction from the two ends of the grip; the other end of each of the left connecting rod and the right connecting rod is in rotational connection with the base body; the upper cover component is rotationally connected between the left connecting rod and the right connecting rod; characterized in that, an inclined rail and a lock-up edge are disposed on one side of the base body; the left connecting rod or the right connecting rod is provided with a slidable height fixing slider which is positioned on the inclined rail; the height fixing slider is provided with a lock; when the height fixing slider is positioned on the inclined rail, the lock is interlocked with the lock-up edge by means of the spring force of a spring; and the lock is provided with a release portion which overcomes the spring force of the spring to release the interlocking between the lock and the lock-up edge.

As an optimal technical means, the lock is a seesaw lever which is connected to the height fixing slider through a pin shaft; and the lower end of the seesaw lever is provided with a lock-up portion which is interlocked with the lock-up edge.

As an optimal technical means, the lock-up portion is hooked; and when the height fixing slider is positioned on the inclined rail, the hooked lock-up portion hooks with the lower side of the lock-up edge to realize interlocking.

As an optimal technical means, the hooked lock-up portion or/and the lock-up edge are provided with inclined surfaces which push the hooked lock-up portion outward.

As an optimal technical means, mated anti-skidding structures are respectively disposed on the lower side of the lock-up edge and on the hooked lock-up portion.

As an optimal technical means, the lock-up portion leans against the lock-up edge to realize interlocking.

As an optimal technical means, the lock-up portion and the lock-up edge are respectively provided with mated anti-skidding structures.

As an optimal technical means, the spring is a spiral spring supported between the upper end of the seesaw lever and the height fixing slider.

As an optimal technical means, the release portion is a pressing portion positioned at the upper end of the seesaw lever.

As an optimal technical means, the release portion is a pulling portion positioned at the lower end of the seesaw lever.

As an optimal technical means, the height fixing slider has two side walls; the seesaw lever is positioned between the two side walls; and the pin shaft is penetrated on the two side walls and the seesaw lever.

As an optimal technical means, the lock-up edge is positioned on the inclined rail.

As an optimal technical means, the left connecting rod or the right connecting rod is provided with a long hole; and the height fixing slider is penetrated in the long hole through a shaft.

As an optimal technical means, the left connecting rod or the right connecting rod has a chute on the inner side; the chute is internally provided with a guide slider; and the guide slider is connected with the height fixing slider.

As an optimal technical means, a structure fastener is assembled on the inner side of the lower part of the height fixing slider, and the structure fastener is in sliding fit with the lower edge of the chute.

According to the present invention, the inclined rail is disposed on one side of the base body, and the corresponding connecting rod is provided with the slidable height fixing slider which is positioned on the inclined rail, so, in use, the height fixing slider can be positioned at any position on the inclined rail to realize stepless height adjustment, without being limited by the quantity of height fixed steps in the prior art. Moreover, the inclined rail is provided with the lock-up edge, while the height fixing slider is provided with the lock; when the height fixing slider is positioned on the inclined rail, the lock is interlocked with the lock-up edge by means of the spring force of the spring to position the height fixing slider on the inclined rail. The lock is provided with the release portion which overcomes the spring force of the spring to release the interlocking between the lock and the lock-up edge. The interlocking between the lock and the lock-up edge can be released by operating the release portion, and the upper cover component can be freely lifted by the handle. In particular, the height of the upper grilling disc relative to the lower grilling disc is adjusted by fine tuning the position of the height fixing slider such that the upper grilling disc better contacts the upper surface of foods (by compacting or loosening) to meet various food surface heating requirements of users.

Figure 1:
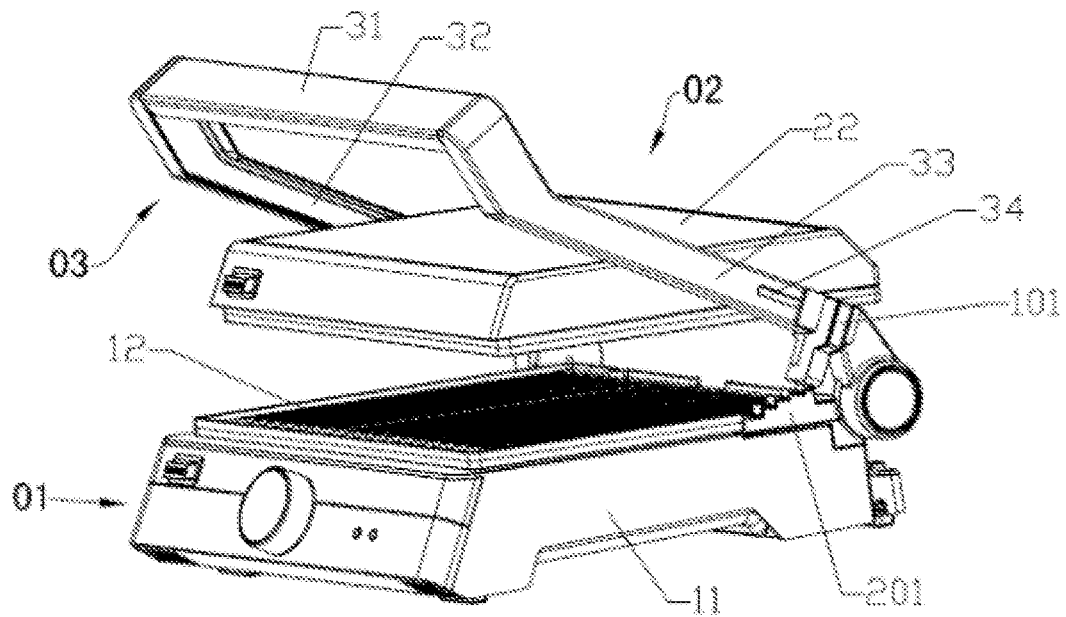
FIG. 1 is a schematic view of one structure of an existing grill.
Figure 2:
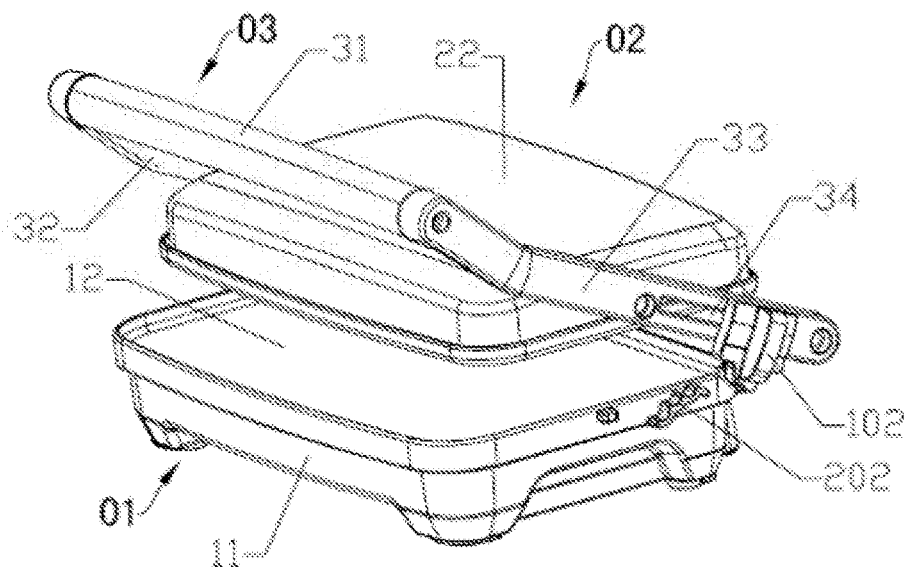
FIG. 2 is a schematic view of another structure of an existing grill.
Figure 3:
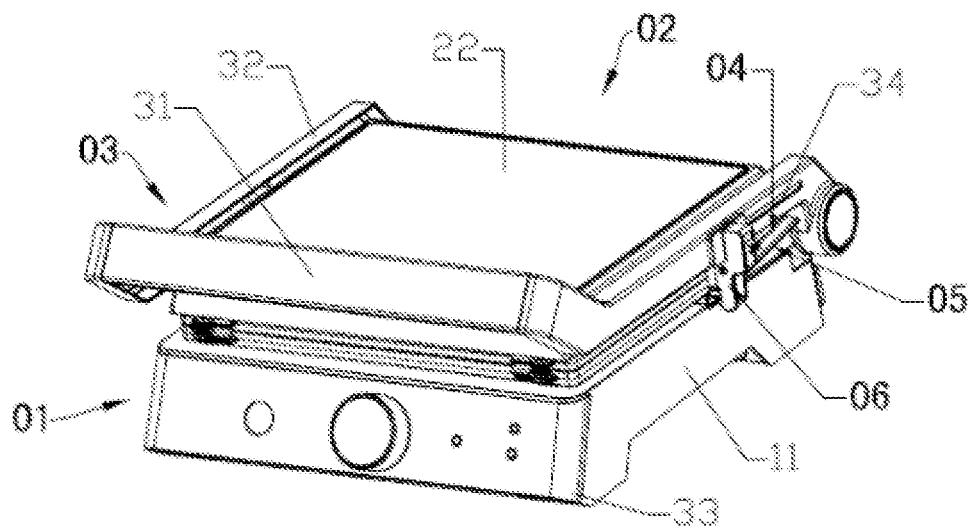
FIG. 3 is a structural view of a grill of the present invention.

Description of marks in the drawings: 01—base body, 11—base, 12—lower grilling disc; 02—upper cover component, 21—upper grilling disc, 22—upper cover; 03—handle, 31—grip, 32—left connecting rod, 33—right connecting rod, 34—long hole, 35—chute; 04—inclined rail; 05—lock-up edge, 51—inclined surface; 06—height fixing slider, 61—side wall, 62—shaft, 63—guide slider, 64—structure fastener; 07—lock, 71—release portion, 72—pin shaft, 73—lock-up portion, 74—inclined surface; 08—spring; 101, 102—sliding push button; 201, 202—height fixing step.

DETAILED DESCRIPTION OF THE INVENTION

The present invention is described in further detail in conjunction with drawings attached to the description.

FIGS. 3-7 illustrate a preferable embodiment of a stepless height-adjustable grill of the present invention, including a base 11, a lower grilling disc 12, an upper grilling disc 21, an upper cover 22 and a handle 03. The lower grilling disc 12 and the base 11 form a base body 01. The upper grilling disc 21 and the upper cover 22 form an upper cover component 02. The handle 03 includes a grip 31, a left connecting rod 32 and a right connecting rod 33. The left connecting rod 32 and the right connecting rod 33 extend toward the same direction from the two ends of the grip. The other end of each of the left connecting rod 32 and the right connecting rod 33 is in rotational connection with the base body. Usually, the base body is provided with a rotating seat; the other end of each of the left connecting rod and the right connecting rod is provided with a shaft, and the shafts are rotationally assembled with the rotating seat to realize the rotational connection. The upper cover component 02 is rotationally connected (for example through a pin shaft) between the left connecting rod 32 and the right connecting rod 33, so by lifting the handle at different angles relative to the base body, the upper cover component can be properly rotated to adjust the angle thereof relative to the base body such that the lower grilling disc and the upper grilling disc can both contact grilled foods. The structure is a conventional structure of a grill for conducting grilling functions. The grill as shown in the figures has the following characteristics: an inclined rail 04 and a lock-up edge 05 are disposed on the right side of the base body 01; the inclined rail 04 can be fixed on the base or the lower grilling disc, or extend from the rotating seat; the right connecting rod is provided with a slidable height fixing slider 06 which is positioned on the inclined rail; the height fixing slider 06 is provided with a lock 07; when the height fixing slider 06 is positioned on the inclined rail 04, the lock 07 is interlocked with the lock-up edge 05 by means of the spring force of a spring 08; and the lock 07 is provided with a release portion 71 which overcomes the spring force of the spring 08 to release the interlocking between the lock and the lock-up edge.

During specific implementation, the inclined rail and the lock-up edge can be on the left side of the base body, and the height fixing slider is assembled on the left connecting rod.

In use, the height fixing slider can be positioned at any position on the inclined rail to realize stepless height adjustment, without being limited by height fixed steps in the prior art. Moreover, when the height fixing slider is positioned on the inclined rail, the lock is interlocked with the lock-up edge by means of the spring force of the spring to position the height fixing slider on the inclined rail to realize positioning lockup of the height fixing slider. The interlocking between the lock and the lock-up edge can be released by operating the release portion, and the upper cover component can be freely lifted by the handle.

Specifically, the lock 07 is a seesaw lever connected to the height fixing slider 06 through the pin shaft 72. In order to assemble the pin shaft, the height fixing slider 06 as shown in the figures has two side walls 61; the seesaw lever is positioned between the two side walls; the pin shaft is penetrated on the two side walls and the seesaw lever, and a lock-up portion 73 interlocked with the lock-up edge is disposed at the lower end of the seesaw lever.

In particular, the lock-up portion 73 is hooked, and when the height fixing slider 06 is positioned on the inclined rail 04, the hooked lock-up portion 73 hooks with the lower side of the lock-up edge 05 to realize interlocking.

In order to automatically realize interlocking during the folding of the upper cover component, the hooked lock-up portion or/and the lock-up edge are provided with inclined surfaces 51, 74 for pushing the hooked lock-up portion outward. When the hooked lock-up portion contacts the lock-up edge, the inclined surface can generate an outward thrust to the hooked lock-up portion to drive the hooked lock-up portion slide on the lock-up edge and to hook the lower side of the lock-up edge to realize interlocking.

In order to ensure reliable interlocking, mated anti-skidding structures 80 (for example, anti-skidding teeth) are respectively disposed on the lower side of the lock-up edge 05 and on the hooked lock-up portion 73.

In order to realize interlocking between the lower end of the seesaw lever and the lock-up edge, the lock-up portion can also lean against the lock-up edge to realize interlocking. In such circumstances, the lock-up portion and the lock-up edge are respectively provided with mated anti-skidding structures 80 (for example, anti-skidding teeth).

The spring 08 is a spiral spring supported between the upper end of the seesaw lever and the height fixing slider. The release portion 71 is a pressing portion positioned at the upper end of the seesaw lever. When the pressing portion is pressed inward, the seesaw lever will raise, and the lower end of the seesaw lever will leave the lock-up edge. As an equal means, the release portion can also be a pulling portion positioned at the lower end of the seesaw lever. Pulling the pulling portion outward can drive the lower end of the seesaw lever leave the lock-up edge.

In order to facilitate manufacturing and ensure assembling precision, the lock-up edge 05 is positioned on the inclined rail 04.

The right connecting rod 33 is provided with a long hole 34; the height fixing slider 06 is penetrated in the long hole 34 through the shaft 62; and the shaft slides in the long hole, driving the height fixing slider to slide.

The right connecting rod 33 has a chute 35 on the inner side; the chute 35 is internally provided with a guide slider 63; and the guide slider 63 is connected with the height fixing slider 06 through a screw.

A structure fastener 64 is assembled on the inner side of the lower part of the height fixing slider 06 through a screw, and the structure fastener 64 is in sliding fit with the lower edge of the chute 35.

Figure 5:
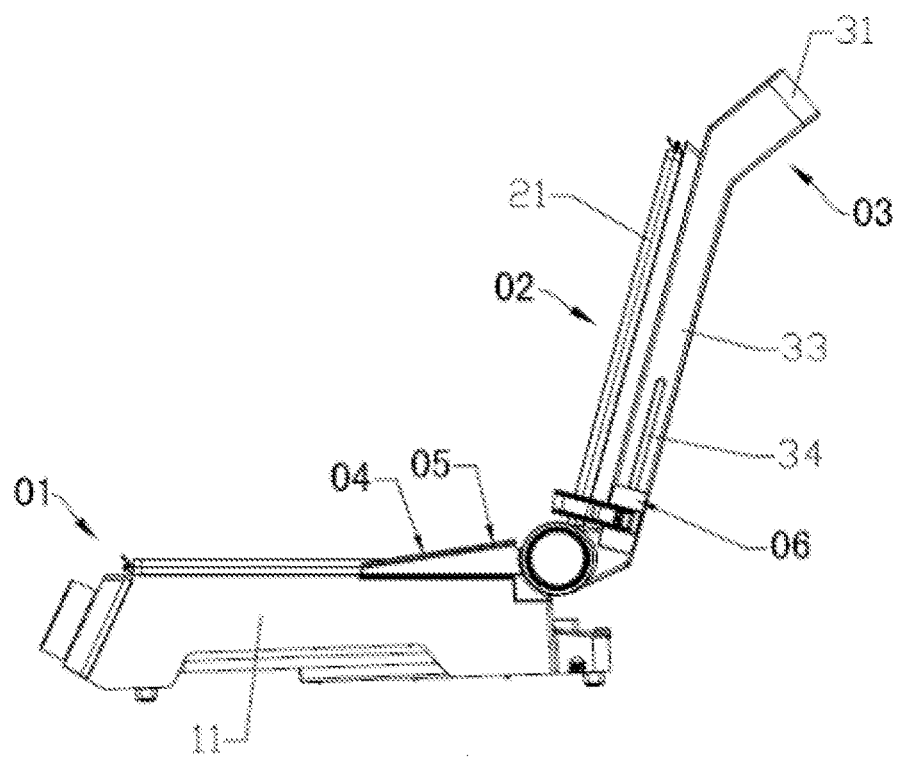
FIG. 5 is a schematic view of the upper cover component, in the fully open state, of the grill as shown in FIG. 3.
Figure 6:
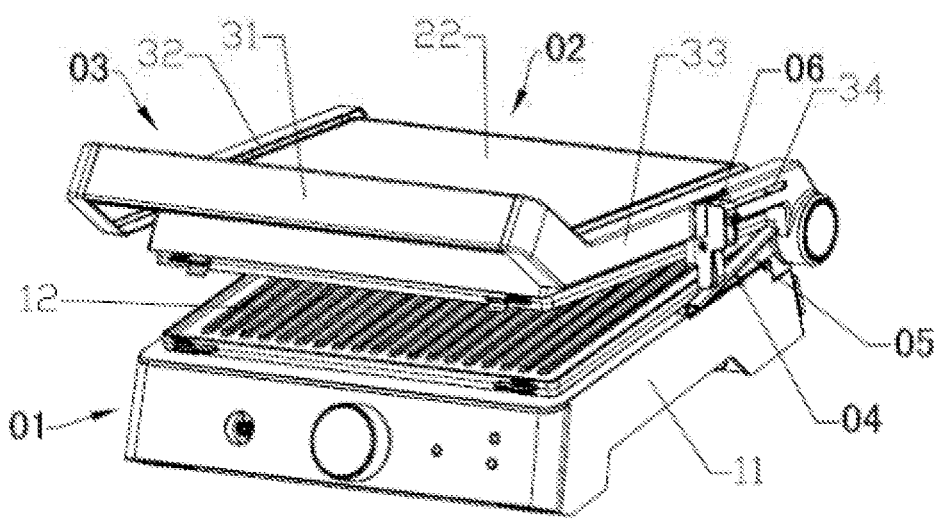
FIG. 6 is a schematic view of the upper cover component, in the state of folding toward a base body, of the grill as shown in FIG. 3.
Figure 7:
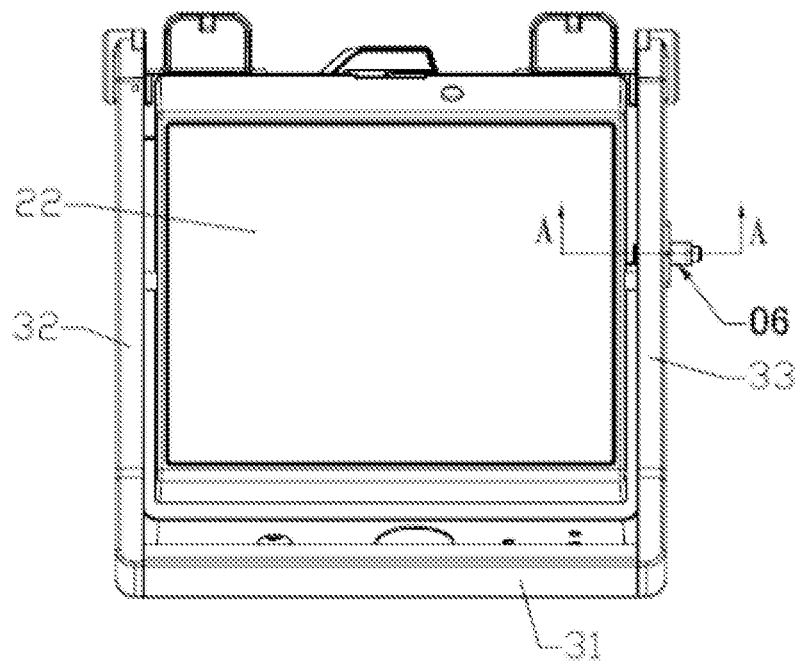
FIG. 7 is a top front projection view of the grill in the state as shown in FIG. 6.
Figure 8:
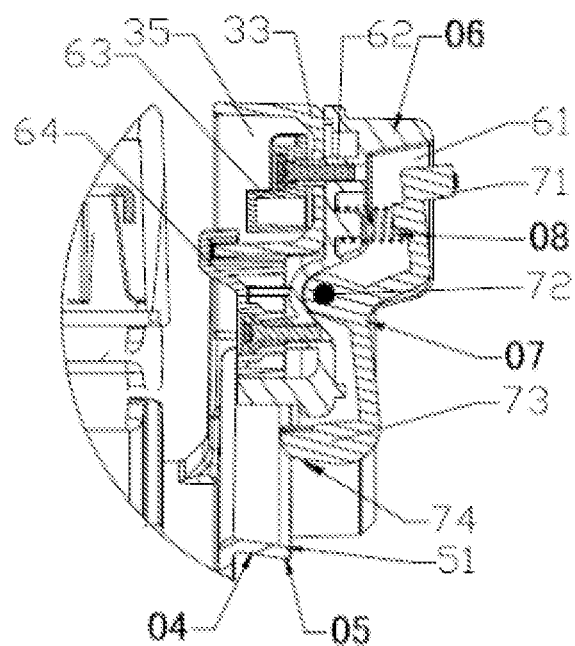
FIG. 8 is a sectional amplified view of FIG. 7 in the A-A direction.
Figure 9:
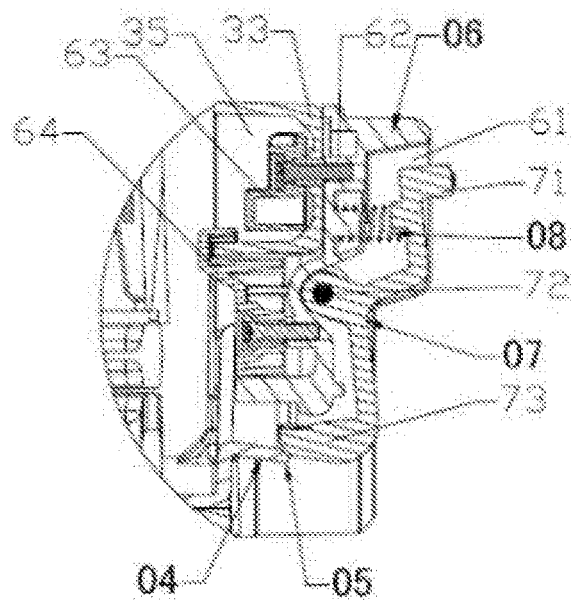
FIG. 9 is a schematic view in which a lock contacts a lock-up edge as shown in FIG. 8.
Figure 10:
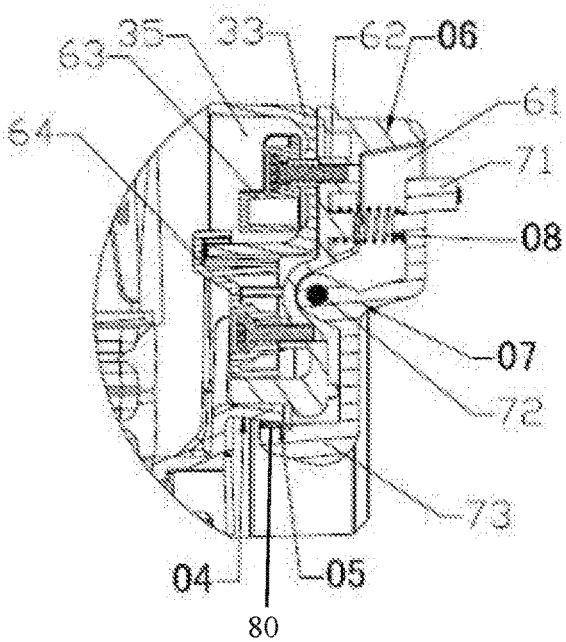
FIG. 10 is a schematic view in which a height fixing slider is positioned on an inclined rail and the lock is interlocked with the lock-up edge by means of the spring force of a spring as shown in FIG. 8.

In use, as shown in FIG. 5, the upper cover component 02 is lifted by using the handle 03, and foods to be grilled are placed in the lower grilling disc. Then, as shown in FIG. 6, the upper cover component 02 is folded. In such circumstances, a specific structure can be seen in FIG. 8; the height fixing slider 06 is not positioned on the inclined rail 04 yet, and the hooked lock-up portion 73 is also positioned on the upper side of the lock-up edge 05. As the upper cover component 02 is being folded, as shown in FIG. 9, the height fixing slider 06 is not positioned on the inclined rail 04 yet, while the hooked lock-up portion 73 contacts the lock-up edge 05. As the upper cover component is being continuously folded, as shown in FIG. 10, the hooked lock-up portion 73 slides on the lock-up edge 05 and then hooks the lower side of the lock-up edge to realize interlocking, and at this time, the height fixing slider 06 is positioned on the inclined rail 04. To adjust the height of the upper cover component by adjusting the position of the height fixing slider 06, the pressing portion is pressed inward to drive the seesaw lever to raise, and then the lower end of the seesaw lever leaves the lock-up edge to release the interlocking. Then, the height fixing slider can slide randomly. In such circumstances, the upper cover component can also be lifted in the state as shown in FIG. 5.

Figure 4:
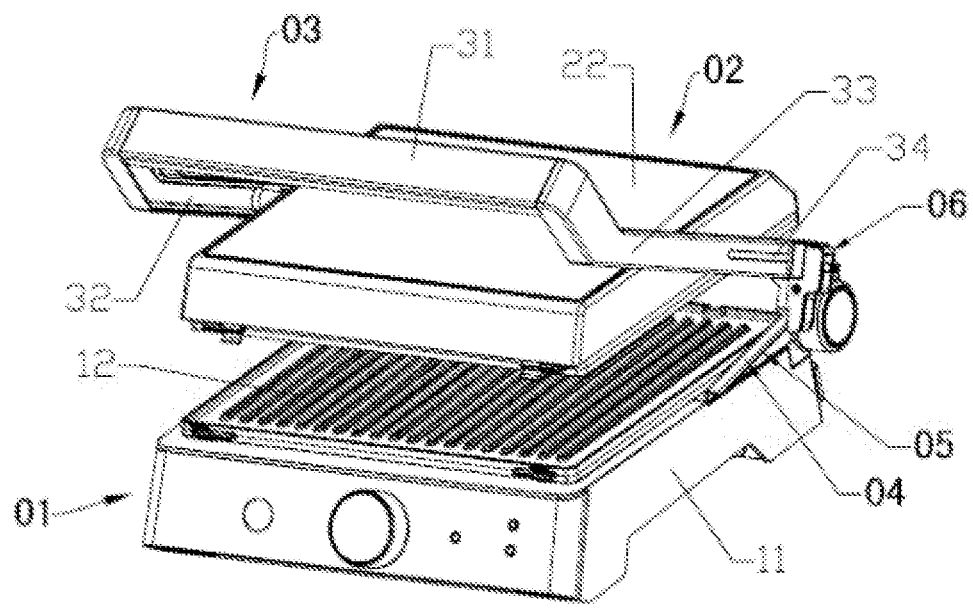
FIG. 4 is a schematic view of an upper cover component, positioned at another height, of the grill as shown in FIG. 3.

Moreover, the height of the upper grilling disc relative to the lower grilling disc is adjusted by fine tuning the position of the height fixing slider such that the upper grilling disc better contacts the upper surface of foods (by compacting or loosening) to meet various food surface heating requirements of users. After foods are placed, the height difference between the upper grilling disc 21 and the lower grilling disc 12 is adjusted by moving the height fixing slider 06 forward or backward. Specifically, moving the height fixing slider 06 forward (moving toward the grip, as shown in FIG. 6) reduces the height difference between the upper grilling disc 21 and the lower grilling disc 12, which helps the upper grilling disc 21 better compact the upper surface of foods and achieves a better heating effect; moving the height fixing slider 06 backward (moving away from the grip, as shown in FIG. 4) increases the height difference between the upper grilling disc 21 and the lower grilling disc 12, which helps the upper grilling disc 21 loosen the foods and reduces an area contacting the foods. Accordingly, various food surface heating requirements of users can be satisfied. In specific use, foods can usually be compacted, so even if the height fixing slider is positioned on the inclined rail and the lock is interlocked with the lock-up edge, the height fixing slider can be moved while the interlocking between the lock and the lock-up edge is released, without lifting the handle.

What is claimed is:

1. A stepless height-adjustable grill comprising:
    a base body (01) comprising a base (11) and a lower grilling disc (12);
    an upper cover component (02) comprising an upper grilling disc (21) and an upper cover (22);
    a handle (03) comprising a grip (31), a left connecting rod (32) and a right connecting rod (33), two ends of the left connecting rod (32) and the right connecting rod (33) being in rotational connection with the base body (01), one of the left connecting rod (32) or right connecting rod (33) having a long hole (34);
    the upper cover component (02) being rotationally connected between the left connecting rod (32) and the right connecting rod (33);
    an adjusting means for adjusting a height of the upper cover component (02) comprising:
        an inclined rail (04) with a lock-up edge (05) disposed on one side of the base body (01);
        a height fixing slider (06) being slidable in the long hole (34) of the left connecting rod (32) or the right connecting rod (33) and being positioned on the inclined rail (04);
        a lock (07) with an release portion (71), which is provided with the height fixing slider (06), for hooking the bottom side of the lock-up edge (05) to realize interlocking; wherein the lock (07) is a seesaw lever which is connected to the height fixing slider (06) through a pin shaft (72), and the lower end of the seesaw lever is provided with a lock-up portion (73) for interlocking with the lock-up edge (05); wherein the release portion (71) is a pressing portion positioned at the upper end of the seesaw lever;
        a spring (08) being supported between the upper end of the lock (07) and the height fixing slider (06);
        wherein the height fixing slider (06) is positioned at any position on the inclined rail (04) to realize a stepless height adjustment the height of the upper cover component (02).

2. The stepless height-adjustable grill according to claim 1, characterized in that the hooked lock-up portion (73) or/and the lock-up edge (05) are provided with inclined surfaces (51, 74) respectively which push the hooked lock-up portion (73) outward.

3. The stepless height-adjustable grill according to claim 1, characterized in that mated anti-skidding structures (80) are respectively disposed on the bottom side of the lock-up edge (05) and on the hooked lock-up portion (73).

4. The stepless height-adjustable grill according to claim 1, characterized in that the lock-up portion (73) leans against the lock-up edge (05) to realize interlocking.

5. The stepless height-adjustable grill according to claim 1, characterized in that the spring (08) is a spiral spring which is supported between the upper end of the seesaw lever and the height fixing slider (06).

6. The stepless height-adjustable grill according to claim 1, characterized in that the height fixing slider (06) has two side walls (61) the seesaw lever is positioned between the two side walls and the pin shaft (72) is penetrated on the two side walls (61) and the seesaw lever.

7. The stepless height-adjustable grill according to claim 1, characterized in that the left connecting rod (32) or the right connecting rod (33) has a chute (35) on the inner side; the chute (35) is internally provided with a guide slider (63); and the guide slider (63) is connected with the height fixing slider (06).

8. The stepless height-adjustable grill according to claim 7, characterized in that a structure fastener (64) is equipped on the inner side of the height fixing slider (06), and the structure fastener (64) is in sliding fit with the bottom edge of the chute (35).

\* \* \* \* \*